Dec. 26, 1933.    H. HUBBELL, JR    1,940,716

SHOCK ABSORBING SWITCH HANDLE

Filed Oct. 18, 1930

Inventor
Harvey Hubbell Jr
By Wooster Davis
Attorneys

Patented Dec. 26, 1933

1,940,716

UNITED STATES PATENT OFFICE 1,940,716

SHOCK ABSORBING SWITCH HANDLE

Harvey Hubbell, Jr., Bridgeport, Conn.

Application October 18, 1930. Serial No. 489,626

6 Claims. (Cl. 200—172)

This invention relates to new and useful improvements in electrical switches and has particular relation to improvements in switch handles, especially handles for toggle switches.

An object of the invention is to provide a shock absorbing switch handle, the switch handle being preferably constructed of resilient flexible material such as live rubber, or including a resilient flexible element in its construction such as a spring through which the operating force is transmitted.

Another object is to provide a shock absorbing switch handle which due to its ability to absorb shocks will not become broken and will prevent bending of the switch elements.

A further object is to provide a switch handle having the characteristics stated and which will give a better grip than handles previously made and which in addition to being an insulator is of a material which manufacturers can conveniently and commercially afford to use.

Additional objects and advantages will become apparent from a consideration of the following description taken in connection with the accompanying drawing wherein satisfactory embodiments of the invention are shown in detail. It will, of course, be understood that this description and the accompanying drawing are for the purpose of making clear the construction and operation and the principle of the invention and that reference must be had to the claims for a definition of the limitations of the invention.

Figure 1:
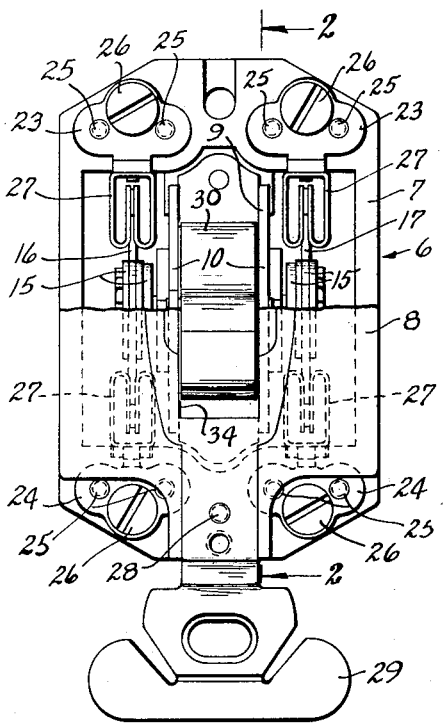
Fig. 1 is a plan view of a switch equipped with one embodiment of the improved handle, part of the switch cover plate being broken away.
Figure 2:
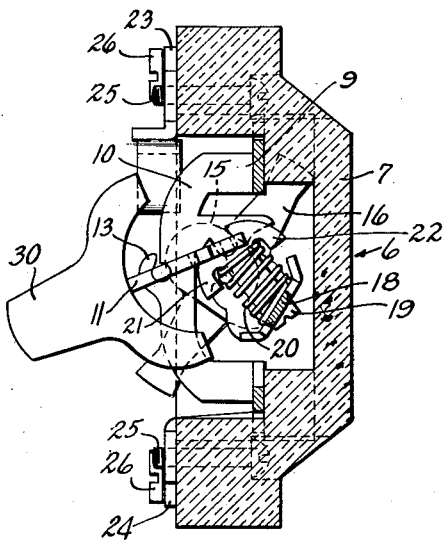
Fig. 2 is a sectional view on the line 2—2 of Fig. 1, the cover plate and mounting strap being omitted.
Figure 3:
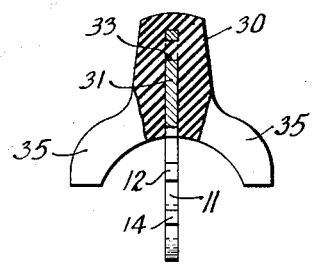
Fig. 3 is a view of the handle removed, the same being shown partly in section.

The improved handle, forming the subject matter of the present invention, is probably most applicable to a toggle switch and is disclosed as applied to such a switch. Considering the drawing in detail, at 6 is shown a toggle switch of well-known construction, the switch including a housing or body 7 of insulating material and a cover member 8 for said housing, the cover member also being of insulating material.

Within the housing 7 there is secured a mounting or supporting member 9 including bridge-like side members 10 disposed between and on which is pivotally mounted the switch operating bar or member 11. As shown the member 11 includes laterally projecting lugs 12 and these lugs pivotally mount the member since the lugs are received beneath the hook-like portions 13 of the side members 10. Below the lugs 12, the member 11 is provided with lateral extensions 14 which limit the throw of the handle member since in either extreme position of the handle they engage the under edges of the respective side members 10.

Mounted on depending arms 15 of the side members 10, is the switch element proper, the same including blades 16 and 17 connected by a cross-piece 18, the entire element being pivotally mounted. The cross-piece 18 has a perforation through which projects an operating member 19, a coil spring 20 being disposed about the member and confined on the member between the cross-piece 18 and the arcuate extensions 21 and 22 on the upper end of the member 19.

Contact elements are arranged for co-operation with the switch blades 16 and 17 and these elements are arranged in pairs, the pairs of elements being designated 23 and 24. Each element is secured in place by screws or other fastenings 25 and binding screws or posts 26 are associated with each contact for securing lead wires thereto and connecting the switch in the house wiring system. The parts of the contact elements 23 and 24 with which the switch blades 16 and 17 engage, are designated 27 and comprise oppositely bent spring arms between which the end portions of the blades 16 and 17 are yieldingly received.

It will be understood that the operating part or stem 11 when swung to one extreme position or the other moves the part 19 through the opening in the cross-piece 18 compressing the coil spring 20. When the parts are moved slightly past center, the spring will snap the switch proper about it pivot and move the blades out of or into engagement with the pairs of contacts. When the parts are all assembled the cover 8 is applied and the cover is secured in place by the screws or other means 28 used for securing the mounting strap 29 to the switch.

According to the present invention as shown in Figs. 1 to 5 a handle 30 is applied to the outer end of the operating stem or member 11.

Usually the handle or operating portion of these switches is of metal or of a brittle moulded material. The handle 30 is of a resilient flexible material such as live rubber and is moulded and vulcanized onto the operating stem 11.

Figure 4:
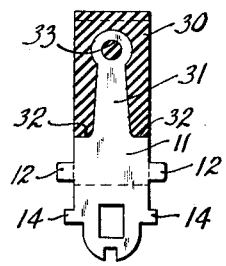
Fig. 4 is a sectional view taken at right angle to Fig. 3.

As shown, the outer end portion, designated 31, of the stem is materially reduced in width as best shown in Fig. 4 whereby to provide shoulders 32. At its extreme portion the stem is somewhat enlarged and perforated as at 33 and this construction is preferable since it facilitates the application of the handle 30 to the stem. During the moulding and vulcanizing operation the material of the handle will pass through the opening 33 and about the reduced portion 31 of the stem, the handle abutting against the shoulders 32.

The cover plate 8 has a slot 34 through which the handle operates, and for the purpose of closing this slot the handle preferably includes extensions or skirt portions 35 formed integral with the handle.

Figures 6, 7:
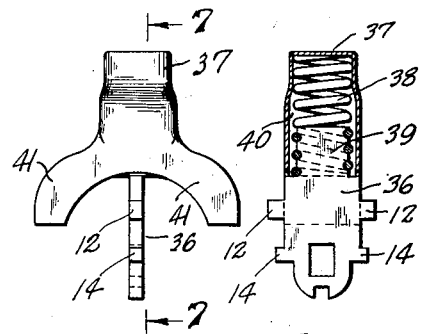
Fig. 6 is a side elevation of a handle of a modified construction.
Fig. 7 is a section thereof substantially on line 7—7 of Fig. 6.
Figure 5:
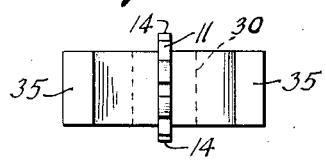
Fig. 5 is a bottom plan view of the handle.

In the modification shown in Figs. 6 and 7 instead of making the gripping portion proper of resilient material such as live rubber, this gripping portion may be of some rigid material such as metal or electrical non-conducting material, but the handle includes in its construction a resilient flexible element through which the operating force for the switch is transmitted. The handle as shown comprises the switch operating member 36 corresponding to the member 11 of the first form, and it is mounted in and connected to the switch mechanism the same as member 11. The finger grip is a hollow member 37 which is secured to the upper end of a fairly stiff coiled spring 38, the other end of this spring being secured to the somewhat narrowed stem 39 of the member 36. If the member 37 is of metal it can be rolled in at its upper end portion tightly about the spring to grip it, or it can be soldered or otherwise secured to it. If member 37 is of other material as insulating composition or the like, it can be molded about the spring, or the spring can have a tight fit in it. It is preferred that the central portion of member 37 be enlarged somewhat as shown at 40 so as to provide some clearance between it and the spring and thus not interfere with the desired limited relative movement between them. It will be seen that in this construction the handle is also yieldable and will absorb shocks the same as in the first form, as the operating force is transmitted through the spring 38. Member 37 also has the projecting side portion 41 corresponding to portions 35 of the first form to close the opening in the face plate.

A switch handle constructed as above described has a number of advantages. For example, being of flexible resilient material, it will yield and will absorb shocks and thereby prevent the bending of the switch elements or mechanism when the handle is forcefully operated or hit with some tool or instrument. Further, a handle constructed as described with some such material as live rubber gives a better grip as the hand will not readily slip on it, and is non-breakable since it is not brittle. Also, the handle if constructed of rubber or the like is of a material which the maker can conveniently and commercially afford to use, and the handle is an insulator preventing electric shocks to the user should there be a loose connection or short circuit in the switch mechanism and being soft is easy on the hands of the operator. In either construction the handle is yieldable and easy on the hands of the operator and protects the switch mechanism.

Having thus set forth the nature of my invention, what I claim is:

1. In an electric switch, an operating member for the switch comprising a laterally movable handle including a resilient flexible material extending beyond the operating member through which the lateral switch operating force is transmitted, and which resilient material is adapted to permit the end portion of the handle to yield laterally in the direction in which the force is applied.

2. In an electric switch, an operating member for the switch including a laterally movable handle on the outer end portion of the operating member, and the greater proportion of said handle comprising a resilient, flexible material adapted to permit the free end portion of the handle to yield laterally when the operating force is applied.

3. In an electric switch, an operating member for the switch including a laterally movable handle on the outer end portion of the operating member, said operating member including a rigid element and the greater proportion of the handle comprising resilient live rubber molded and vulcanized onto the free end portion of the rigid element, said handle constituting the means through which the switch operating force is transmitted and being adapted to yield laterally in transmitting said force.

4. In an electric switch, a rigid pivoted switch operating member, and a handle the greater proportion of which is live rubber molded and vulcanized onto the free end portion of said rigid operating member, said handle constituting the means through which the switch operating force is transmitted and adapted to yield laterally in transmitting said force.

5. In an electric switch, a laterally movable operating member, a handle including a hollow gripping portion, and a spring enclosed by said portion and secured thereto at its outer end and to the operating member at its inner end and serving to transmit the operating force from the gripping portion to the operating member in a direction laterally of the axis of the handle, and said spring adapted to permit the gripping portion to yield laterally in transmitting said force.

6. In an electric switch, a fulcrumed operating lever for said switch, said lever including a handle the greater proportion of which outwardly of the fulcrum is of resilient and flexible material through which the operating force for the switch is transmitted and said handle is adapted to yield laterally in transmitting the operating force to the switch.

HARVEY HUBBELL, Jr.